(12) United States Patent
Lima et al.

(10) Patent No.: US 8,889,781 B2
(45) Date of Patent: Nov. 18, 2014

(54) RECYCLED THERMOPLASTIC WITH TOUGHENER

(75) Inventors: Avelino F Lima, North Hills, WV (US); Barbara Ann Wood, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/590,233

(22) Filed: Aug. 21, 2012

(65) Prior Publication Data

US 2013/0053503 A1 Feb. 28, 2013

Related U.S. Application Data

(60) Provisional application No. 61/525,934, filed on Aug. 22, 2011.

(51) Int. Cl.
*C08L 77/06* (2006.01)
*C08K 7/14* (2006.01)

(52) U.S. Cl.
USPC ............................ 524/514; 524/538; 524/504

(58) Field of Classification Search
USPC .......................................... 524/504, 514, 538
See application file for complete search history.

(56) References Cited

U.S. PATENT DOCUMENTS

| | | | |
|---|---|---|---|
| 4,174,358 A | 11/1979 | Epstein | |
| 4,180,529 A | 12/1979 | Hofmann | |
| 5,719,198 A | 2/1998 | Young | |
| 6,756,412 B2 | 6/2004 | Muzzy | |
| 2004/0063857 A1 | 4/2004 | Vathauer et al. | |
| 2004/0186190 A1* | 9/2004 | Mckinnon | ........................ 521/40 |
| 2006/0094822 A1 | 5/2006 | Gaggar et al. | |
| 2006/0281871 A1 | 12/2006 | Steffl | |
| 2009/0130417 A1 | 5/2009 | Maeda et al. | |
| 2010/0029819 A1 | 2/2010 | Palmer et al. | |
| 2011/0207838 A1 | 8/2011 | Lima | |

FOREIGN PATENT DOCUMENTS

| | | | |
|---|---|---|---|
| EP | 0190001 | | 1/1985 |
| EP | 0196194 | | 3/1986 |
| JP | 2003-119330 | * | 4/2003 |
| JP | 2003119330 | | 4/2003 |
| WO | 8911507 | | 11/1989 |

OTHER PUBLICATIONS

Patent Abstracts of Japan 2003-119330, Apr. 23, 2003.
International Search Report PCT/US2012/051767.
U.S. Appl. No. 13/031,366, filed Feb. 21, 2011, Inventor: Avelino F. Lima—Office Action dated Jun. 11, 2013.

* cited by examiner

*Primary Examiner* — Robert D. Harlan

(57) ABSTRACT

Disclosed is a thermoplastic composition including a) a recycled thermoplastic including polyamide resin, polyolefin and mineral filler, wherein the recycled thermoplastic includes at least 60 weight percent content of recycled polyamide selected from the group consisting of polyamide 66, polyamide 6, blends of polyamide 66 and polyamide 6, and copolymers having repeat units of polyamide 66 and polyamide 6; and at least 1 weight percent content of polyolefin; b) polymer toughener, wherein the polymer toughener includes at least 50 to 85 weight percent non-functionalized rubber and 15 to 50 weight percent of a functionalized rubber; and c) 10 to 50 reinforcing agent having a minimum aspect ratio of 3; and molded articles manufactured therefrom.

4 Claims, No Drawings

RECYCLED THERMOPLASTIC WITH TOUGHENER

CROSS REFERENCE TO RELATED APPLICATION

This application claims priority of Application No. 61/525,934, filed Aug. 22, 2011.

FIELD OF INVENTION

The present invention relates to the field of recycled thermoplastic including polyamide and a nonreactive polymeric toughener.

BACKGROUND OF INVENTION

The recycle of thermoplastics is potentially a cost effective, and resource efficient pathway to a variety of molded thermoplastic parts. Recycled thermoplastic can be derived from many sources. One of the more plentiful and less expensive sources is polyamide 6,6 derived from carpet, such as manufacturing waste, referred to as post industrial polyamide 66 (PI PA66), or post consumer recycle polyamide 6,6 (PCR PA66).

It is well known that polyamide PCR PA66 presents challenges to create products that can replace virgin polyamide 66 (PA66) as well as post industrial PA66 due to difficulty to create a pure stream of PA66.

In the marketplace there is polyamide PCR PA66 having purities ranging from 60% to 99% nylon content. This source of polymer has been used successfully in reinforced applications. For instance U.S. Pat. No. 6,756,412 discloses a fiber reinforced thermoplastic composite.

SUMMARY OF INVENTION

Disclosed is a thermoplastic composition comprising
a) 20 to 80 weight percent of a recycled thermoplastic comprising polyamide resin, polypropylene and mineral filler, wherein said recycled thermoplastic comprises at least 60 weight percent content of recycled polyamide selected from the group consisting of polyamide 66, polyamide 6, blends of polyamide 66 and polyamide 6, and copolymers having repeat units of polyamide 66 and polyamide 6; and at least 1 weight percent content of polyolefin, and wherein said recycled polyamide content is equal to the percent nitrogen content as compared to the nitrogen content of a pure polyamide 66 standard, said nitrogen content being determined by a Nitrogen Combustion Analysis Determination Method; and said polypropylene content is as determined by subtraction of the polyamide content and mineral filler content, as determined from Nitrogen combustion analysis and Ash Analysis, respectively, from the total weight of recycled thermoplastic;
b) 5 to 20 weight percent of polymer toughener, wherein said polymer toughener consists essentially of at least 50 to 85 weight percent non-functionalized rubber (and 15 to 50 weight percent of a functionalized rubber;
c) 10 to 50 reinforcing agent having a minimum aspect ratio of 3;
d) 0 to 40 weight percentage of virgin polyamide 66 and/or Post Industrial polyamide 66; and
e) 0 to 10 weight percent of additives selected from the group. consisting of mold release, flow enhancers, thermal stabilizers, antistatic agents, blowing agents, lubricants, plasticizers, and colorant and pigments;
wherein the weight percents of a), b), c), d) and e) are based on the total weight of the thermoplastic composition.

Another embodiment is a shaped article comprising the thermoplastic resin composition as disclosed above.

DETAILED DESCRIPTION

The thermoplastic composition comprises a recycled thermoplastic comprising polyamide resin, polypropylene and mineral filler. The recycled thermoplastic comprises at least 60 weight percent content of recycled polyamide, and preferably at least 65 weight percent, and more preferably at least 68 weight percent recycled polyamide. The recycled polyamide is selected from the group consisting of polyamide 66, polyamide 6, blends of polyamide 66 and polyamide 6, and copolymers having repeat units of polyamide 66 and polyamide 6. The recycled polyamide content in the thermoplastic composition herein is considered equal to the percent nitrogen content as compared to the nitrogen content of a pure polyamide 66 standard, the nitrogen content being determined by a Nitrogen Combustion Analysis Determination Method. For instance, if pure PA 66 is determined to have a nitrogen content of 12.4 percent, and the recycled thermoplastic is determined to have a nitrogen content of 10.0 percent, then the recycled thermoplastic is considered to have:

10.0%/12.4%=80.6% recycled polyamide.

A suitable standard PA 66 is, for instance, PA 66 commercially available as Zytel® ZYT101 NC010 polyamide 66 resin available from E. I. du Pont de Nemours & Co., Inc.

The recycled thermoplastic comprises at least 1 weight percent content, preferably at least 2 weight percent, and more preferably at least 8 weight percent, of polyolefin. The polyolefin content is determined by subtraction of the polyamide content, as determined from nitrogen analysis, and mineral filler content, as determined with combustion ash analysis, from the total weight of recycled thermoplastic. The polyolefin may be a homopolymer or copolymer comprising repeat units derived from polymerization of a C2-C8 alpha-olefin, C2-C8 alkyldienes, and styrene and alpha-methyl styrene. The polyolefin may be selected from the group consisting of polyethylene, polypropylene, polyethylene copolymers, polypropylene copolymers and styrene-butadiene copolymers. In one embodiment the polyolefin is polypropylene.

The recycled polyamide may comprise at least 90 weight percent, or at least 95 weight percent, of polyamide 66 and/or polyamide 6. The recycled polyamide may comprise at most 98 weight percent of polyamide 66 and/or polyamide 6. Polyamide 66 refers to poly(hexamethylene hexanediamide). Polyamide 6 refers to poly(caprolactam).

The recycled thermoplastic is preferably derived from recycled carpet and/or carpet fiber. A source of the recycled thermoplastic polyamide useful in the thermoplastic composition is referred to as post consumer recycled (PCR) polyamide.

The PCR polyamide comprises at least 60 weight percent polyamide; with the remainder weight percent comprising polypropylene, rubber, fillers, and/or other additives commonly used in carpets. The presence of polyolefin is indicated by a melt transition peak lower than 170° C. measured in accordance with ISO 11357 evident in the differential scanning calorimetry (DSC) of the recycled thermoplastic. The mineral filler content is established by Ash analysis test run for 25 min at 600° C. The mineral filler may be calcium carbonate.

Suitable PCRPA66 materials have a relative viscosity of at least 30, as determined with ASTM D789 method.

Polymeric Toughener

The polymeric toughener is a polymer, typically an elastomer having a melting point and/or glass transition points below 25° C., or is rubber-like, i.e., has a heat of melting (measured by ASTM Method D3418-82) of less than about 10 J/g, more preferably less than about 5 J/g, and/or has a melting point of less than 80° C., more preferably less than about 60° C. Preferably the polymeric toughener has a weight average molecular weight of about 5,000 or more, more preferably about 10,000 or more, when measured by gel permeation chromatography using polyethylene standards.

The polymeric toughener is present at 5 to 20 weight percent of the total weight of the thermoplastic composition. Preferably the polymeric toughener is present at 7 to 20 weight percent, and more preferably, 8 to 20 weight percent of the total weight of the thermoplastic composition. The polymeric toughener consists essentially of 50 to 85 weight percent non-functionalized rubber and 15 to 50 weight percent of a functionalized rubber.

A functionalized rubber has attached to it reactive functional groups which can react with the polyamide. Such functional groups are usually "attached" to the functionalized rubber by grafting small molecules onto an already existing polymer or by copolymerizing a monomer containing the desired functional group when the functionalized rubber molecules are made by copolymerization. As an example of grafting, maleic anhydride may be grafted onto a hydrocarbon rubber (such as an ethylene/α-olefin copolymer, an α-olefin being a straight chain olefin with a terminal double bond such a propylene or 1-octane) using free radical grafting techniques. The resulting grafted polymer has carboxylic anhydride and/or carboxyl groups attached to it.

Ethylene copolymers are an example of a functionalized rubber wherein the functional groups are copolymerized into the polymer, for instance, a copolymer of ethylene and a (meth)acrylate monomer containing the appropriate functional group. Herein the term (meth)acrylate means the compound may be either an acrylate, a methacrylate, or a mixture of the two. Useful (meth)acrylate functional compounds include (meth)acrylic acid, 2-hydroxyethyl(meth)acrylate, glycidyl(meth)acrylate, and 2-isocyanatoethyl(meth)acrylate. In addition to ethylene and a functionalized (meth)acrylate monomer, other monomers may be copolymerized into such a polymer, such as vinyl acetate, unfunctionalized (meth)acrylate esters such as ethyl(meth)acrylate, n-butyl (meth)acrylate, i-butyl(meth)acrylate and cyclohexyl(meth) acrylate. Functionalized rubbers include those listed in U.S. Pat. No. 4,174,358, which is hereby incorporated by reference.

Another functionalized rubber is a polymer having carboxylic acid metal salts. Such polymers may be made by grafting or by copolymerizing a carboxyl or carboxylic anhydride containing compound to attach it to the polymer. Useful materials of this sort include Surlyn® ionomers available from E. I. DuPont de Nemours & Co. Inc., Wilmington, Del. 19898 USA, and the metal neutralized maleic anhydride grafted ethylene/α-olefin polymer described above. Preferred metal cations for these carboxylate salts include Zn, Li, Mg and Mn.

Functionalized rubbers useful in the invention include those selected from the group consisting of linear low density polyethylene (LLDPE) or linear low density polyethylene grafted with an unsaturated carboxylic anhydride, ethylene copolymers; ethylene/α-olefin or ethylene/α-olefin/diene copolymer grafted with an unsaturated carboxylic anhydride; core-shell polymers.

Herein the term ethylene copolymers include ethylene terpolymers and ethylene multi-polymers, i.e. having greater than three different repeat units. Ethylene copolymers useful as polymeric tougheners in the invention include those selected from the group consisting of ethylene copolymers of the formula E/X/Y wherein:

E is the radical formed from ethylene;
X is selected from the group consisting of radicals formed from

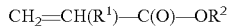

wherein $R^1$ is H, $CH_3$ or $C_2H_5$, and $R^2$ is an alkyl group having 1-8 carbon atoms; vinyl acetate; and mixtures thereof; wherein X comprises 0 to 50 weight % of E/X/Y copolymer;

Y is one or more radicals formed from monomers selected from the group consisting of carbon monoxide, sulfur dioxide, acrylonitrile, maleic anhydride, maleic acid diesters, (meth)acrylic acid, maleic acid, maleic acid monoesters, itaconic acid, fumaric acid, fumaric acid monoesters and potassium, sodium and zinc salts of said preceding acids, glycidyl (meth)acrylate, 2-hydroxyethyl(meth)acrylate, 2-isocyanatoethyl(meth)acrylate and glycidyl vinyl ether; wherein Y is from 0.5 to 35 weight % of the E/X/Y copolymer, and preferably 0.5-20 weight percent of the E/X/Y copolymer, and E is the remainder weight percent and preferably comprises 40-90 weight percent of the E/X/Y copolymer.

It is preferred that the functionalized rubber contain a minimum of about 0.5, more preferably 1.0, very preferably about 2.5 weight percent of repeat units and/or grafted molecules containing functional groups or carboxylate salts (including the metal), and a maximum of about 15, more preferably about 13, and very preferably about 10 weight percent of monomers containing functional groups or carboxylate salts (including the metal). It is to be understood than any preferred minimum amount may be combined with any preferred maximum amount to form a preferred range. There may be more than one type of functional monomer present in the functionalized rubber. In one embodiment the polymeric toughener comprises about 0.5 to about 10 weight percent of repeat units and/or grafted molecules containing functional groups or carboxylate salts (including the metal).

Useful functionalized rubbers include:
(a) A copolymer of ethylene, glycidyl(meth)acrylate, and optionally one or more (meth)acrylate esters.
(b) An ethylene/α-olefin or ethylene/α-olefin/diene (EPDM) copolymer grafted with an unsaturated carboxylic anhydride such as maleic anhydride.
(c) A copolymer of ethylene, 2-isocyanatoethyl(meth) acrylate, and optionally one or more (meth)acrylate esters.
(d) a copolymer of ethylene and acrylic acid reacted with a Zn, Li, Mg or Mn compound to form the corresponding ionomer.

Nonfunctionalized rubbers include polymers such as ethylene/α-olefin/diene (EPDM) rubber, polyolefins including polyethylene (PE) and polypropylene, and ethylene/α-olefin (EP) rubbers such as ethylene/1-octene copolymer, and the like such as those commercial copolymers under the ENGAGE® brand from Dow Chemical, Midland Mich. Other nonfunctional rubbers include the styrene-containing polymers including acrylonitrile-styrene copolymer, acrylonitrile-butadiene-styrene copolymer, styrene-isoprene-styrene copolymer, styrene-hydrogenated isoprene-styrene copolymer, styrene-butadiene-styrene copolymer, styrene-hydrogenated butadiene-styrene copolymer. These polymers are not random and are sold under Kraton®) polystyrene brand. For example, acrylonitrile-butadiene-styrene, or ABS, is a terpolymer made by polymerizing styrene and acrylonitrile in the presence of polybutadiene. The proportions can vary from 15 to 35% acrylonitrile, 5 to 30% butadiene and 40 to 60% styrene. The result is a long chain of polybutadiene criss-crossed with shorter chains of poly(styrene acrylonitrile).

Other nonfunctional rubbers useful in the invention are having a (vinyl aromatic comonomer) core comprising an ethylene copolymer as disclosed above, the core optionally cross-linked and optionally containing a vinyl aromatic comonomer, for instance styrene; and a shell comprising another polymer that may include poly(methyl methacrylate). The core-shell polymer may be made up of multiple layers, prepared by a multi-stage, sequential polymerization technique of the type described in U.S. Pat. No. 4,180,529. Each successive stage is polymerized in the presence of the previously polymerized stages. Thus, each layer is polymerized as a layer on top of the immediately preceding stage.

Nonfunctional rubbers may be selected from the group consisting of ethylene/octene copolymer and ethylene/propylene/diene terpolymer. A suitable ethylene/octene copolymer is Egage® 8180 elastomer available from Dow Chemical Company (Midland, Mich., USA).

The thermoplastic resin composition may include 0 to 40 weight percent of virgin PA66 polyamide and/or Post Industrial PA66. Post industrial PA 66 refers to material that has been used in a manufacturing process, but has not been exposed to consumers. One source of Post industrial PA 66 NRMAMB resin consisting of greater than 98 weight percent polyamide 66, available from E.I. du Pont de Nemours & Co., Inc., Wilmington, Del.

Virgin polyamide 66 is a PA 66 resin that is provided from the polymerization process without further melt-blending of any additives. An examples is Zytel® ZYT101 NC010 polyamide 66 resin available from E. I. du Pont de Nemours & Co., Inc. (Wilmington, Del., USA).

The reinforcement agent may be any filler having an aspect ratio of at least 3. The reinforcement agent may be selected from the group consisting of glass fibers with circular and noncircular cross-section, glass flakes, carbon fibers, talc, mica, wollastonite, and mixtures thereof.

Glass fibers with noncircular cross-section refer to glass fiber having a cross section having a major axis lying perpendicular to a longitudinal direction of the glass fiber and corresponding to the longest linear distance in the cross section. The non-circular cross section has a minor axis corresponding to the longest linear distance in the cross section in a direction perpendicular to the major axis. The non-circular cross section of the fiber may have a variety of shapes including a cocoon-type (figure-eight) shape, a rectangular shape; an elliptical shape; a roughly triangular shape; a polygonal shape; and an oblong shape. As will be understood by those skilled in the art, the cross section may have other shapes. The ratio of the length of the major axis to that of the minor access is preferably between about 3:1 and about 300:1. The ratio is more preferably between about 3:1 and 200:1 and yet more preferably between about 3:1 to about 10:1. Suitable glass fiber are disclosed in EP 0 190 001 and EP 0 196 194.

Preferred reinforcing agents include glass fibers and the minerals such as mica, wollastonite and talc. Glass fiber is a preferred reinforcing agent.

The thermoplastic resin composition may include 0 to 10 weight percent of additives selected from the group consisting of mold release (e.g. aluminum distearate, [AlSt], flow enhancers (e.g. phthalic anhydride, adipic acid, terephthalic acid), thermal stabilizers (e.g. potassium halides/CuI/AlSt triblends and hindered phenols, antistatic agents, blowing agents, lubricants, plasticizers, and colorant and pigments.

The thermoplastic resin composition is a mixture by melt-blending, in which all polymeric ingredients are adequately mixed, and all non-polymeric ingredients are adequately dispersed in a polymer matrix.

Another embodiment is a process for recycling a thermoplastic comprising melt blending:
a) 20 to 80 weight percent of a recycled thermoplastic comprising polyamide resin, polypropylene and mineral filler, wherein said recycled thermoplastic comprises at least 60 weight percent content of recycled polyamide, preferably at least 65 wt %, and more preferably at least 68 wt % polyamide, selected from the group consisting of polyamide 66, polyamide 6, and copolymers having repeat units of polyamide 66 and polyamide 6; and at least 1 weight percent content, and preferably at least 2 weight percent and more preferably at least 8 weight percent, of polypropylene, and wherein said recycled polyamide content is equal to the percent nitrogen content as compared to the nitrogen content of a pure polyamide 66 standard, said nitrogen content being determined by a Nitrogen Combustion Analysis Determination Method; and said polypropylene content is as determined by subtraction of the polyamide content and mineral filler content, as determined from Nitrogen combustion analysis and Ash Analysis, respectively, from the total weight of recycled thermoplastic;
b) 5 to 20 weight percent of polymer toughener, wherein said polymer toughener consists essentially of at least 50 to 85 weight percent non-functionalized rubber and 15 to 50 weight percent of a functionalized rubber;
c) 0 to 40 weight percentage of virgin polyamide 66 and/or Post Industrial polyamide 66;
d) 10 to 50 reinforcing agent having a minimum aspect ratio of 3; and
e) 0 to 10 weight percent of additives selected from the group. consisting of mold release, flow enhancers, thermal stabilizers, antistatic agents, blowing agents, lubricants, plasticizers, and colorant and pigments;
wherein the weight percents of a), b), c), d) and e) are based on the total weight of the thermoplastic resin composition; and
forming a pellet or molded article from said melt blend.

The preferences for said recycled polyamide, polymer toughener and reinforcing agent in the process are the same as stated above for the thermoplastic composition.

Any melt-blending method may be used for mixing polymeric ingredients and non-polymeric ingredients of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. Extrusion of the melt-blend through a plurality of orifices provides strands that may be chopped to provide pellets.

Another embodiment is a shaped article comprising the thermoplastic resin composition as disclosed above. Shaped articles include injection molded blow molded and extruded articles.

Methods

Compounding and Molding Methods

The compositions listed in Table 1 were fed to the rear of a 58 mm co-rotating twin screw extruder fitted with a moderately hard working screw run at 300-330 rpms with a 600 lb/hr feed rate; with the exception that components designated as "side fed" in Table 1 were added at barrel #6 of the extruder. The barrel temperature was set at 280° C. when virgin (referred to as Polyamide 66) or PCR PA 66 was used (C-1 and C-2); and 230-260° C. when PCR polyamide 6 was used Sample Preparation and Physical Testing The compositions were pelletized after exiting the extruder. After drying pellets overnight using a nitrogen bleed, the pellets were injection molded in a Demag #2 injection molding machine at a melt temperature of 287-293° C. and a mold temperature of 77-83° C. to provide 4 mm ISO all-purpose bars. The bars were vacuum sealed in a foil lined plastic bag to preserve them in the dry-as-molded (DAM) condition until they were cut and after conditioning in accordance with ISO 179 Method, specimens were tested for Notched Charpy at 23° C.

Unnotched Charpy test method is the same used for Notched Charpy except that bars are not notched prior to being tested.

Tensile strength, elongation at break, and tensile modulus were tested dry as molded on a tensile tester by ISO 527 –1/–2 at 23° C. and stain rate of 5 mm/min.

Heat deflection temperature was measured at 1.8 MPa in accordance with ISO 75.

Melt viscosity (MV) of all Examples were measured using a Kayeness rheometer. All samples were conditioned to moisture content of 0.11 to 0.15 prior testing.

Nitrogen Determination Method

This method is applicable to the direct measurement of nitrogen in nylon and other raw materials. For % nitrogen, the calculation is based on the N content of PA 66 (theoretical 12.38% N). An example of a pure polyamide 66 standard is Zytel® 101 resin available from E. I. du Pont de Nemours & Co., Inc. Wilmington, Del., USA. Method calculations can be used to report results as wt % nylon, and/or wt % nitrogen.

Recycled thermoplastic pellets are combusted in the LECO furnace at 850-950° C. Combustion gases are filtered, water vapor is removed and the nitrogen oxides are reduced to $N_2$ gas in the reduction furnace. Thermal conductivity detection is used to detect and quantify the $N_2$ gas produced. The analyzer is standardized using the base nylon characteristic of the compounded resin pellets (PA 66). Since rubber tougheners and other non-nylon ingredients do not contribute nitrogen, the measured decrease in detected nitrogen relative to the base nylon standard is proportional to non-nylon content concentration.

Ash Determination was measured after heating for 25 min at 600° C. to avoid calcium carbonate decomposition which occurs at temperatures over 600° C.

Materials

Polyamide 66 refers to Zytel® ZYT101 NC010 polyamide 66 resin available from E. I. du Pont de Nemours & Co., Inc. (Wilmington, Del., USA).

Polyamide 6 refers to Ultramid® B27 polyamide 6 resin available from BASF Corporation, Florham Park, N.J., 07932.

PCR-1 PA 66 refers post consumer recycled polyamide 66, having a polyamide 66 content based on nitrogen analysis of 75 weight percent and polypropylene content of about 15 weight percent, derived from post consumer recycled carpet, available from Columbia Recycling Corp., Dalton, Ga. 30722.

PCR-2 Polyamide 66 refers to N-66S-B post consumer recycled polyamide 66, having a polyamide 66 content based on nitrogen analysis of 97 weight percent and less than 1 weight percent of polypropylene, derived from post consumer recycled carpet, available from Shaw Industries, 330 Brickyard Rd., Dalton, Ga. 30720.

PCR-3 PA6 refers to Los Angeles Post consumer PA6 recycle having about 69 weight percent PA 6.

Glass Fiber refers to PPG3610 chopped glass fiber available fro PPG Industries, Pittsburgh, Pa.

Nonfunctionalized rubber refers to Engage® 8180 elastomer, a non-functional polymer toughener consisting of ethylene/1-octene copolymer available from Dow Chemical Company (Midland, Mich., USA).

Functionalized rubber refers to TRX®301 copolymer, a maleic anhydride modified EPDM from available from E.I. DuPont de Nemours and Company, Wilmington, Del., USA.

C-Black refers to ZYTEL® FE3786 BK031C black concentrate provided by E. I. du Pont de Nemours & Co., Inc., Wilmington, Del., USA.

Copper HS is a heat stabilizer consisting of 7 parts potassium bromide, 1 part cuprous (I) iodide and 0.5 part aluminum distearate was purchased from Shepherd Chemical Co. 4900 Beech Street, Norwood, Ohio 45212.

DDDA refers to dodecanedioic acid

Fusabond® P613 resin refers to a maleic anhydride functionalized polypropylene resin available from E. I. du Pont de Nemours & Co., Inc., Wilmington, Del., USA.

Lubricant refers to aluminum stearate purchased from Chemtura Corporation, Middlebury, Conn. 06749.

Kemamide® E180 fatty amide Is a mold release agent from Chemtura Corporation, Middlebury, Conn. 06749.

EXAMPLES

Example 1 and Comparative Examples C1-C3 are listed in Table 1 Comparative Examples C2 and C3 comprise PA 66 virgin polymer having 50 wt % and 100 weight percent functionalized rubber, respectively. C3 has improved Un-notched and Notched Charpy, and slightly improved elongation to break over C2, and is typical of compositions having increased weight fraction of functionalized rubber.

Example 1 and Comparative Example C1 comprise low purity PCR PA66. Example 1, including 50 weight % of functionalized rubber, shows the same notched Charpy and 10% higher un-notched Charpy, as C1, which contains 100 weight % functionalized rubber. This performance is unexpected because one of ordinary skill would expect a higher weight fraction of functionalized rubber to give improved toughness, as exhibited with the virgin PA66 in C2 and C3. This means that the maximum toughness can be achieve in PCR grade PA66 with a smaller weight fraction of functionalized rubber, as compared to that of virgin PA 66.

TABLE 1

6.5% Rubber Modification

| | Example | | | |
|---|---|---|---|---|
| | 1 | C1 | C2 | C3 |
| PA66 | | | 58.9 | 58.9 |
| PCR-1 PA 66 | 58.9 | 58.9 | | |
| Functionalized rubber | 3.25 | 6.50 | 3.25 | 6.50 |
| Nonfunctionalized rubber | 3.25 | | 3.25 | |
| DDDA | 0.2 | 0.2 | 0.2 | 0.2 |
| Copper HS | 0.3 | 0.3 | 0.3 | 0.3 |
| C-Black | 1 | 1 | 1 | 1 |
| Glass Fiber | 33 | 33 | 33 | 33 |
| Lubricant | 0.1 | 0.1 | 0.1 | 0.1 |

TABLE 1-continued 6.5% Rubber Modification

| | Example | | | |
|---|---|---|---|---|
| | 1 | C1 | C2 | C3 |
| Graft Ratio (%) | 50 | 100 | 50 | 100 |
| KAY-1C | 148 | 145 | 127 | 211 |
| Notched Charpy at 23° C., KJ/m² | 11 | 11 | 17 | 18.2 |
| Un-notched Charpy at 23° C., KJ/m² | 66 | 59 | 96 | 99 |

TABLE 1-continued 6.5% Rubber Modification

| | Example | | | |
|---|---|---|---|---|
| | 1 | C1 | C2 | C3 |
| Heat Deflection Temperature at 1.82 MPa, ° C. | 238 | 238 | 251 | 250 |
| Tensile Strength at Break, MPa | 121 | 125 | 175 | 172 |
| Elongation at Break, % | 2.9 | 2.6 | 3.8 | 4.0 |

Examples 2 and 3 and Comparative Examples C4-C9 are listed in Table 2.

Examples 2 and 3 and Comparative Example C4 comprise low purity PCR PA66. Examples 2 and 3, including 15 weight % and 50 weight % of functionalized rubber, respectively, shows significantly higher notched Charpy and un-notched Charpy, as compared to Comparative Example C4 comprising 100 weight percent of functionalized rubber. Additionally Examples 2 and 3, show significantly higher heat distortion temperature, elongation at break and tensile strength as compared to Comparative Example C4.

However, Comparative Example C7 comprising virgin PA 66 and 100 weight % functionalized rubber show physical properties that are slightly higher or about the same as Comparative Examples C5 and C6 comprising virgin PA66 and 15 weight % and 50 weight % of functionalized rubber, respectively.

The improvement in physical properties seen in the low purity PCR PA 66 examples having a mixture of functionalized and unfunctionalized rubbers are not evident in virgin PA 66 or high purity PA 66 examples (C8 and C9). Thus the results are considered surprising and unexpected.

TABLE 2

13% Rubber Modification PA66

| | Example | | | | | | | |
|---|---|---|---|---|---|---|---|---|
| | 2 | 3 | C4 | C5 | C6 | C7 | C8 | C9 |
| PA66 | | | | 52.7 | 52.7 | 52.7 | | |
| PCR-1 PA 66 | 52.7 | 52.7 | 52.7 | | | | | |
| PCR-2 PA 66 | | | | | | | 52.7 | 52.7 |
| Functionalized rubber | 1.9 | 6.35 | 13 | 1.9 | 6.35 | 13 | 6.35 | 13 |
| Nonfunctionalized rubber | 10.8 | 6.35 | | 10.8 | 6.35 | | 6.35 | |
| DDDA | 0.2 | 0.2 | 0.2 | 0.2 | 0.2 | 0.2 | 0.2 | 0.2 |
| Copper HS | 0.3 | 0.3 | 0.3 | 0.3 | 0.3 | 0.3 | 0.3 | 0.3 |
| C-Black | 1 | 1 | 1 | 1 | 1 | 1 | 1 | 1 |
| Glass Fiber | 33 | 33 | 33 | 33 | 33 | 33 | 33 | 33 |
| Lubricant | 0.1 | 0.1 | 0.1 | 0.1 | 0.1 | 0.1 | 0.1 | 0.1 |
| Graft Ratio, % | 15 | 50 | 100 | 15 | 50 | 100 | 50 | 100 |
| KAY-1C | 135 | 142 | 155 | 263 | 233 | 297 | 170 | 143 |
| Notched Charpy at 23° C., KJ/m² | 11.1 | 13.7 | 8.2 | 16.3 | 20.3 | 21.4 | 13.8 | 14.0 |
| Un-notched Charpy at 23° C., KJ/m² | 67 | 79 | 50 | 95 | 82 | 94 | 66 | 70 |
| Heat Deflection Temperature at 1.82 MPa, ° C. | 238 | 226 | 157 | 245 | 243 | 243 | 240 | 240 |
| Tensile Strength at Break, MPa | 105 | 95 | 49 | 152 | 134 | 139 | 117 | 127 |
| Elongation at Break, % | 3.2 | 2.8 | 1.4 | 4.0 | 4.0 | 4.1 | 3.0 | 2.7 |

Examples 4 and 5 and Comparative Examples C10-C15 are listed in Table 3.

Examples 4 and 5 and Comparative Example C10 and C11 comprise low purity PCR PA6. Examples 4 and 5, including 25 weight % and 50 weight % of functionalized rubber, respectively, shows significantly higher notched Charpy and un-notched Charpy, as compared to Comparative Example C10 and C11 comprising 75 and 100 weight percent of functionalized rubber, respectively. Additionally Examples 4 and 5, show significantly higher heat distortion temperature, elongation at break and tensile strength as compared to Comparative Example C10 and C11.

However, Comparative Examples C12-C15 comprising virgin PA 6 and 25, 50, 75 and 100 weight % functionalized rubber, respectively show physical properties that are slightly higher or about the same.

The improvement in physical properties exhibited in the low purity PCR PA 6 examples, having a mixture of functionalized and unfunctionalized rubbers, are not evident in virgin PA 6. Thus the results are considered surprising and unexpected.

TABLE 3

| | \multicolumn{8}{c}{13% Rubber Modification PA6 (AD 7898)} | | | | | | | |
|---|---|---|---|---|---|---|---|---|
| | \multicolumn{8}{c}{Example} | | | | | | | |
| | 4 | 5 | C10 | C11 | C12 | C13 | C14 | C15 |
| PCR-3 PA6 | 52.5 | 52.5 | 52.5 | 52.5 | | | | |
| PA6 | | | | | 52.5 | 52.5 | 52.5 | 52.5 |
| Nonfunctionalized rubber | 9.75 | 6.5 | 3.25 | | 9.75 | 6.5 | 3.25 | |
| Functionalized rubber | 3.25 | 6.50 | 9.75 | 13 | 3.25 | 6.50 | 9.75 | 13 |
| C-Black | 1 | 1 | 1 | 1 | 1 | 1 | 1 | 1 |
| Glass fiber | 33 | 33 | 33 | 33 | 33 | 33 | 33 | 33 |
| Copper HS | 0.3 | 0.3 | 0.3 | 0.3 | 0.3 | 0.3 | 0.3 | 0.3 |
| Kemamide E180 | 0.2 | 0.2 | 0.2 | 0.2 | 0.2 | 0.2 | 0.2 | 0.2 |
| Graft Ratio, % | 25 | 50 | 75 | 100 | 25 | 50 | 75 | 100 |
| KAY-1C | 167 | 173 | 180 | 192 | 249 | 216 | 310 | 342 |
| Notched Charpy at 23° C., KJ/m$^2$ | 20.7 | 20.9 | 13.1 | 10.8 | 35.0 | 35.6 | 33.7 | 33.8 |
| Un-notched Charpy at 23° C., KJ/m$^2$ | 76 | 67 | 38 | 28 | 105 | 107 | 111 | 108 |
| Heat Deflection Temperature at 1.82 MPa, ° C. | 191 | 187 | 151 | 139 | 201 | 202 | 202 | 200 |
| Tensile Strength at Break, MPa | 95 | 89 | 72 | 52 | 133 | 130 | 134 | 132 |
| Elongation at Break, % | 4.8 | 3.9 | 2.3 | 1.6 | 6.2 | 6.8 | 6.8 | 7.1 |

We claim:

1. A thermoplastic composition comprising
   a) 20 to 80 weight percent of a recycled thermoplastic composition comprising polyamide resin, polypropylene and mineral filler, wherein said recycled thermoplastic composition comprises at least 60 weight percent content of recycled polyamide selected from the group consisting of polyamide 66, polyamide 6, blends of polyamide 66 and polyamide 6, and copolymers having repeat units of polyamide 66 and polyamide 6; and at least 1 weight percent content of polypropylene, and wherein said recycled polyamide content is equal to the percent nitrogen content as compared to the nitrogen content of a pure polyamide 66 standard, said nitrogen content being determined by a Nitrogen Combustion Analysis Determination Method; and said polypropylene content is as determined by subtraction of the polyamide content and mineral filler content, as determined from Nitrogen combustion analysis and Ash Analysis, respectively, from the total weight of recycled thermoplastic;
   b) 5 to 20 weight percent of polymer toughener, wherein said polymer toughener consists essentially of at least 50 to 85 weight percent non-functionalized rubber and 15 to 50 weight percent of a functionalized rubber;
   c) 10 to 50 weight percent reinforcing agent having a minimum aspect ratio of 3;
   d) 0 to 40 weight percent of virgin polyamide 66 and/or post industrial polyamide 66 comprising greater than 98 weight percent polyamide 66; and
   e) 0 to 10 weight percent of additives selected from the group consisting of mold release, flow enhancers, thermal stabilizers, antistatic agents, blowing agents, lubricants, plasticizers, and colorant and pigments;
   wherein the weight percents of a), b), c), d) and e) are based on the total weight of the thermoplastic resin composition.

2. The thermoplastic composition of claim 1 wherein said non-functionalized rubber is selected from the group consisting of ethylene/alpha olefin copolymer and ethylene/propylene/diene terpolymer.

3. The thermoplastic composition of claim 1 wherein the reinforcing agent is glass fiber.

4. The thermoplastic composition of claim 1 wherein the recycled polyamide is polyamide 66.

* * * * *